United States Patent
Chung et al.

(10) Patent No.: US 6,815,636 B2
(45) Date of Patent: Nov. 9, 2004

(54) SINTERING USING THERMAL IMAGE FEEDBACK

(75) Inventors: Mark Chung, Castaic, CA (US); Andre-Luc Allanic, Valencia, CA (US)

(73) Assignee: 3D Systems, Inc., Valencia, CA (US)

(*) Notice: Subject to any disclaimer, the term of this patent is extended or adjusted under 35 U.S.C. 154(b) by 0 days.

(21) Appl. No.: 10/410,686

(22) Filed: Apr. 9, 2003

(65) Prior Publication Data

US 2004/0200816 A1 Oct. 14, 2004

(51) Int. Cl.[7] .............................................. B23K 26/34
(52) U.S. Cl. ......................... 219/121.65; 219/121.66; 219/121.83
(58) Field of Search ..................... 219/121.6, 121.65, 219/121.66, 121.83, 121.85, 385, 411

(56) References Cited

U.S. PATENT DOCUMENTS

| | | |
|---|---|---|
| 4,247,508 A | 1/1981 | Housholder |
| 4,863,538 A | 9/1989 | Deckard |
| 4,944,817 A | 7/1990 | Bourell et al. |
| 5,132,143 A | 7/1992 | Deckard |
| 5,252,264 A | 10/1993 | Forderhase et al. |
| 5,393,482 A | 2/1995 | Benda et al. |
| 5,427,733 A | 6/1995 | Benda et al. |
| 5,508,489 A | 4/1996 | Benda et al. |
| 5,530,221 A | 6/1996 | Benda et al. |
| 5,637,175 A * | 6/1997 | Feygin et al. ................ 156/264 |
| 5,639,070 A * | 6/1997 | Deckard ...................... 264/497 |
| 5,786,023 A * | 7/1998 | Maxwell et al. ............... 427/8 |
| 5,908,569 A * | 6/1999 | Wilkening et al. ........... 219/385 |

OTHER PUBLICATIONS

Gibson, Ian and Ming, Ling Wai, "Low–Cost Machine Vision Monitoring of the SLS Process," Dept. Mechanical Engineering, The University of Hong Kong, *Solid Freeform Fabrication Symposium, 1997*, pp. 59–66. (No month).

* cited by examiner

*Primary Examiner*—Samuel M. Heinrich
(74) *Attorney, Agent, or Firm*—Michael Ervin; Ralph D'Alessandro

(57) ABSTRACT

A method and apparatus for forming three dimensional objects by laser sintering that utilizes a broad area thermal vision system such as an infrared camera that can measure multiple temperatures across the target area and use that temperature data as feed back to a control system that both adjusts a zoned radiant heater system and adjusts scan speed and laser power to control temperatures across the target area.

13 Claims, 3 Drawing Sheets

SINTERING USING THERMAL IMAGE FEEDBACK

BACKGROUND OF THE INVENTION

1. Field of the Invention

This invention is in the field of freeform fabrication and is directed to the fabrication of three-dimensional objects by selective laser sintering. More specifically, it is related to temperature control in the process chamber of a laser sintering system.

2. Description of the Relevant Art

The field of freeform fabrication of parts has, in recent years, made significant improvements in providing high strength, high density parts for use in the design and pilot production of many useful articles. Freeform fabrication generally refers to the manufacture of articles directly from computer-aided-design (CAD) databases in an automated fashion, rather than by conventional machining of prototype articles according to engineering drawings. As a result, the time required to produce prototype parts from engineering designs has been reduced from several weeks to a matter of a few hours.

By way of background, an example of a freeform fabrication technology is the selective laser sintering process practiced in systems available from 3D Systems, Inc., in which articles are produced from a laser-fusible powder in layerwise fashion. According to this process, a thin layer of powder is dispensed and then fused, melted, or sintered, by laser energy that is directed to those portions of the powder corresponding to a cross-section of the article. Conventional selective laser sintering systems, such as the Vanguard system available from 3D Systems, Inc., position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The computer based control system is programmed with information indicative of the desired boundaries of a plurality of cross sections of the part to be produced. The laser may be scanned across the powder in raster fashion, with modulation of the laser affected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the selective laser sintering technology may be found in U.S. Pat. Nos. 4,863,538, 5,132,143, and 4,944,817, all assigned to Board of Regents, The University of Texas System, and in U.S. Pat. No. 4,247,508, Housholder, all incorporated herein by this reference.

The selective laser sintering technology has enabled the direct manufacture of three-dimensional articles of high resolution and dimensional accuracy from a variety of materials including polystyrene, some nylons, other plastics, and composite materials such as polymer coated metals and ceramics. Polystyrene parts may be used in the generation of tooling by way of the well-known "lost wax" process. In addition, selective laser sintering may be used for the direct fabrication of molds from a CAD database representation of the object to be molded in the fabricated molds; in this case, computer operations will "invert" the CAD database representation of the object to be formed, to directly form the negative molds from the powder.

Current commercial laser sintering systems, such as those sold by 3D Systems Systems, Inc. of Valencia, Calif., utilize dual piston cartridge feed systems with a counter-rotating roller and an infrared sensor or pyrometer to measure the thermal conditions in the process chamber and the powder bed.

Although laser systems have proven to be very effective in delivering both powder and thermal energy in a precise and efficient way the use of a single infrared sensor focused on one point on the target surface has some known limitations. The target surface does not normally have a uniform temperature across the entire surface. Thermal gradients are possible from front to back of the process chamber and powder bed due to the presence of an observation window at the front of the system. Gradients are possible from side to side due to the presence of lower temperatures at each side of the part bed. In addition, the recently fused part in the system is hotter than the surrounding powder. Recognizing this, other investigators have proposed other approaches to temperature control in laser sintering.

U.S. Pat. Nos. 5,427,733, 5,530,221, 5,393,482, and 5,508,489, all by Benda et. al. and assigned to United Technologies address this issue with approaches based on an optics and scanning system that detects the temperature of the powder at a detection point near the sintering location and uses that information to modify the laser power and/or modify the temperature of the surrounding powder by use of a traveling defocused laser beam. In this approach and others similar to it, the control is achieved by control of the laser beam power and not by control of a radiant heater. This approach has not seen widespread commercial implementation, probably due to the required sophistication and expense of the optics system as well as issues around quality of the radiated temperature signal from the powder as different powders are employed.

A different approach was proposed by Gibson and Ming in a paper presented at the Solid FreeForm Fabrication Symposium in 1997 and entitled "Low-Cost Machine Vision Monitoring of the SLS process". In this approach the concept described was to use a machine vision system (a CCD camera) to focus on the target surface of a laser sintering process and to measure gray scale color variation of the surface to calculate temperature and modify laser power to maintain consistent part quality. This approach resulted in a lower cost, simpler implementation, but was still based on an average temperature value measured by the camera system.

Thus a need exists for a more complete control scheme for laser sintering; one that measures temperatures all across the target surface and makes both global (radiant heater) and local (laser) adjustments to the heat input in order to maintain uniform temperatures.

BRIEF SUMMARY OF THE INVENTION

It is an aspect of the present invention to provide a method and apparatus for fabricating objects with selective laser sintering while maintaining a more uniform temperature across the entire target surface area in the process chamber.

It is a further aspect of the present invention to provide such a method that is reliable and with acceptable cost.

It is a feature of the method and apparatus of the present invention that a laser sintering system utilizes a broad area thermal vision system, such as an infrared camera, to measure multiple temperatures across the target area and uses that temperature data as feed back to a control system.

It is another feature of the present invention that the control system both adjusts a zoned radiant heater system and the scan speed and/or laser power to control temperatures across the target area.

It is an advantage of the present invention that ideal powder layer temperatures can be estimated and used to produce three-dimensional objects with reduced distortion and curl.

It is another advantage of the present invention that the overall temperature control in the top layers of powder in the powder bed are improved.

The invention includes a method for forming a three dimensional article by laser sintering comprising the steps of: dispensing a first top layer of powder on a target area; moderating the temperature of said first top layer of powder to a predetermined goal; directing an energy beam over said target area causing said first top layer of powder to fuse powder in select locations to form an integral layer; dispensing a second top layer of powder over the fused and unfused powder of said first top layer; moderating the temperature of said second top layer of powder to a predetermined goal; directing said energy beam over said target area causing said second layer of powder to form a second integral layer bonded to said first integral layer; repeating steps (a) to (f) to form additional layers that are integrally bonded to adjacent layers so as to form a three-dimensional article, wherein the temperature moderating step comprises: using a machine vision system to image multiple temperatures of the current top layer of powder and adjust those temperatures by adjusting the radiant heat output from a zoned radiant heater located above said target area.

The invention also includes a method for forming a three dimensional article by laser sintering comprising the steps of: dispensing a first top layer of powder on a target area; moderating the temperature of the first top layer of powder to a predetermined goal; directing an energy beam over the target area causing the first top layer of powder to fuse powder in select locations to form an integral layer; dispensing a second top layer of powder over the fused and unfused powder of the first top layer; moderating the temperature of the second top layer of powder to a predetermined goal; directing the energy beam over the target area causing the second layer of powder to form a second integral layer bonded to the first integral layer; and repeating steps (a) to (f) to form additional layers that are integrally bonded to adjacent layers so as to form a three dimensional article, wherein the directing steps include the sub steps of: estimating, from known mathematical models, the desired temperatures in the region of the part being produced, then reading, from the digital output of a machine vision system the actual temperatures in the region of the part being produced, and then adjusting the energy beam power and/or scan speed during the directing step based on differences between the desired and actual temperatures to achieve desired temperatures across the target area.

The invention also includes an apparatus for producing parts from a powder comprising: a process chamber having a target area at which an additive process is performed; a means for depositing and leveling a layer of powder on the target area; a means for fusing selected portions of a layer of the powder at the target area; a machine vision system for measuring temperatures across the x-y coordinates of the target area and a radiant heater for heating the target area to control temperatures of fused and unfused powder at top surface of the target area.

DESCRIPTION OF THE DRAWINGS

These and other aspects, features and advantages of the invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
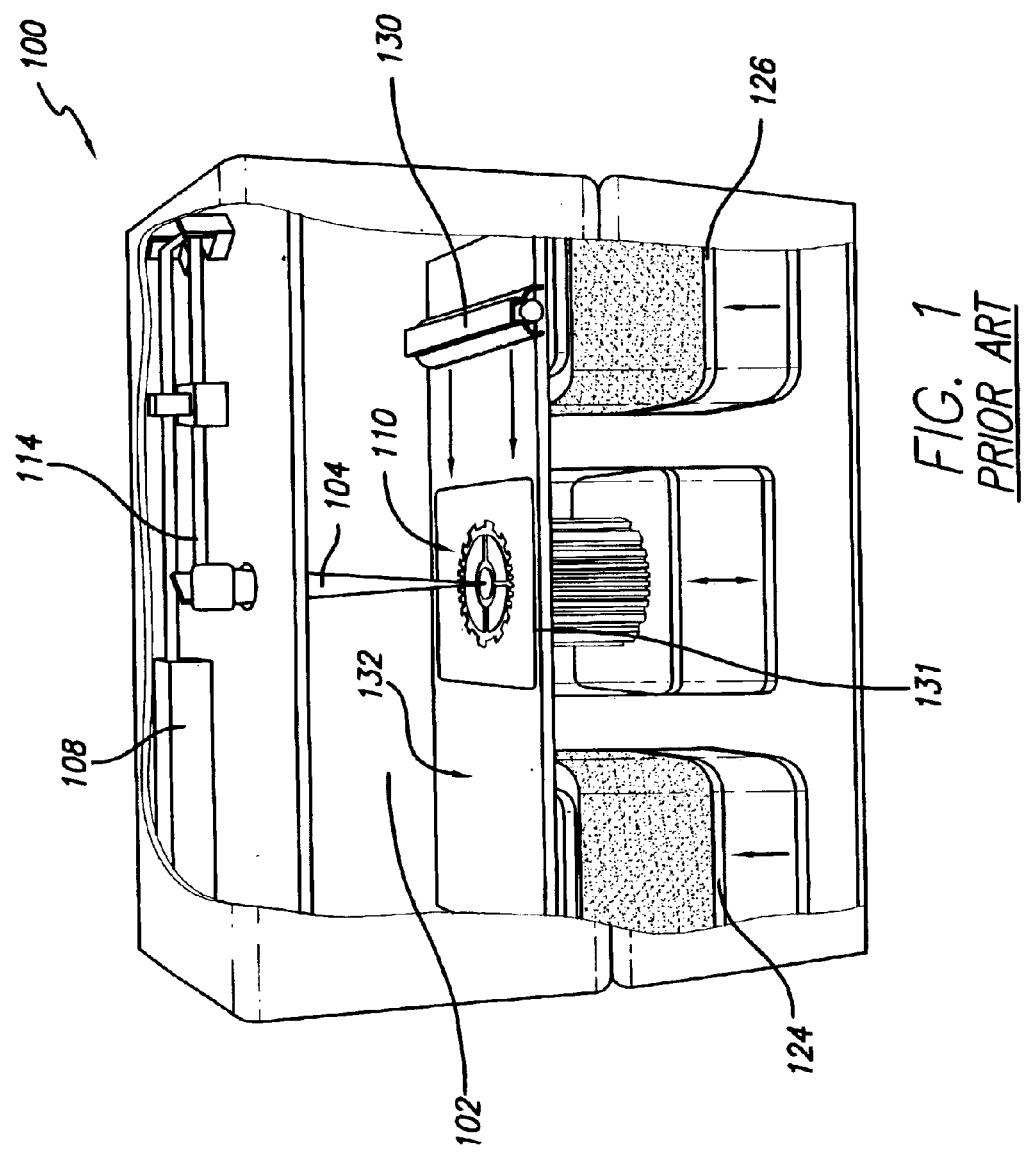
FIG. 1 is a view of a prior art selective laser sintering machine.

FIG. 1 illustrates, by way of background, a rendering of a conventional selective laser sintering system, indicated generally by the numeral 100, currently sold by 3D Systems, Inc. of Valencia, Calif. FIG. 1 is a rendering shown without doors for clarity. A carbon dioxide laser 108 and its associated scanning system 114 is shown mounted in a unit above a process chamber 102 that includes a powder bed 132, two powder cartridge feed systems indicated generally by the numerals 124 and 126, and a counter-rotating leveling roller 130. The process chamber 102 maintains the appropriate temperature and atmospheric composition (typically an inert atmosphere such as nitrogen) for the fabrication of the article.

Figure 2:
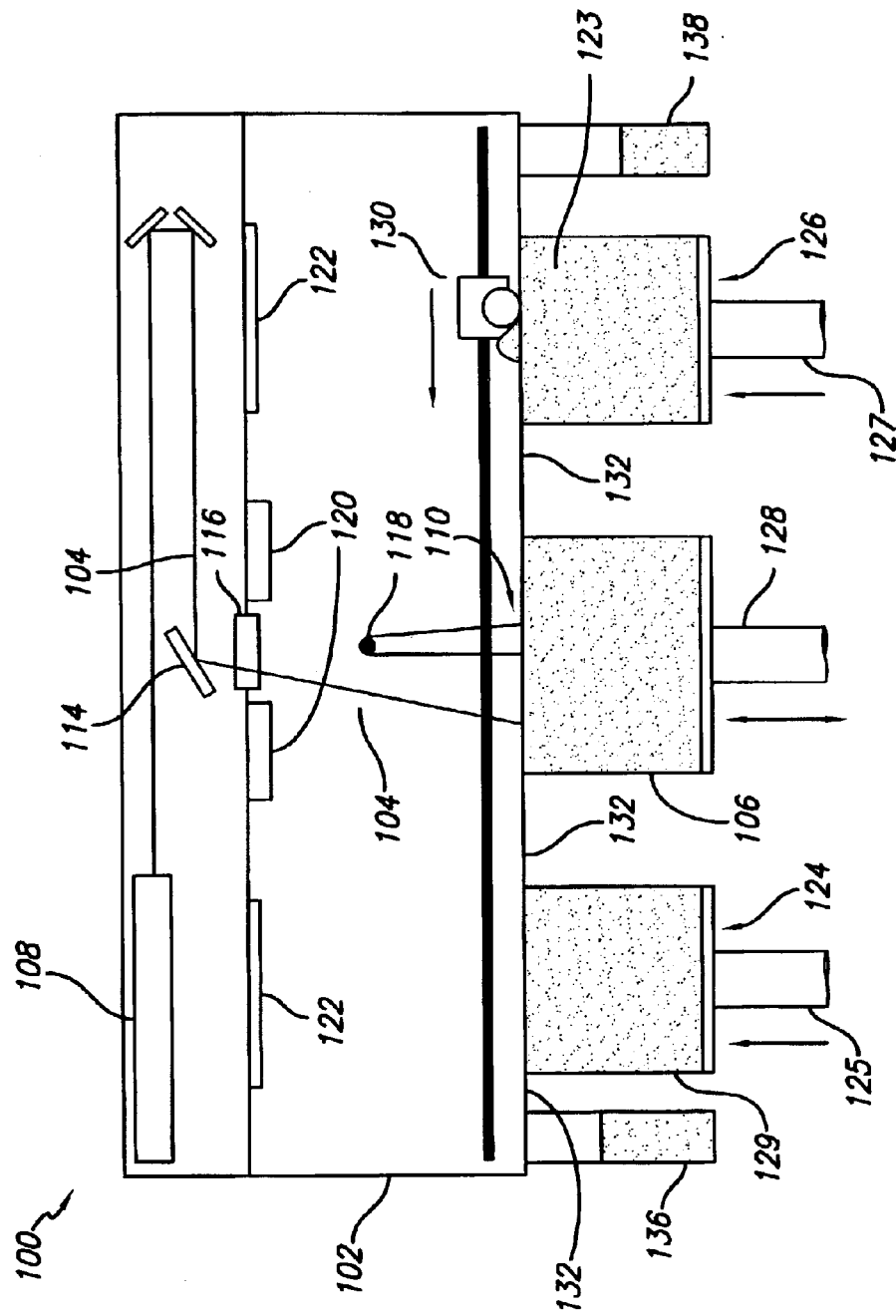
FIG. 2 is a front view of a conventional selective laser sintering machine showing some of the mechanisms involved.

Operation of this conventional selective laser sintering system is shown in FIG. 2 in a front view of the process, with no doors shown for clarity. A laser beam 104 is generated by laser 108, and aimed at target area, indicated generally the numeral 110, by way of scanning system 114, generally including laser optics and galvanometer-driven mirrors that deflect the laser beam. The laser and galvanometer systems are isolated from the heat of the process hot chamber 102 by a laser window 116. The laser window 116 is situated within radiant heater elements 120 that heat the target area 110 of the powder bed 132 below. These heater elements 120 may be ring shaped (rectangular or circular) panels or radiant heater rods that surround the laser window. An infrared sensor or pyrometer 118 is situated at the rear of the chamber and is focused on a small area of the target surface to read and record the surface temperature. The reading from this sensor is fed into a control scheme that controls the power to the radiant heater elements 120 to maintain a constant temperature of the target surface 110 of the powder bed 132.

The deflection of the laser beam is controlled, in combination with modulation of laser 108 itself, to direct laser energy to those locations of the fusible powder layer in the target area 110 of powder bed 132 corresponding to the cross-section of the article to be formed in that layer. Scanning system 114 may scan the laser beam across the powder in a raster-scan fashion, or in vector fashion.

The two powder cartridge feed systems (124,126) feed powder into the system 100 by means of a push up piston system. A powder bed 132 receives powder on its horizontal part bed 131, best seen in outline FIG. 1, from the two feed pistons 125 and 127 as is described below. Feed system 126 first pushes up a measured amount of powder from powder 123 in system 126 by the upward movement of piston 127 and a counter-rotating roller 130 picks up and spreads the powder over the powder bed 132 in a uniform manner. The counter-rotating roller 130 passes completely over the target area 110 and powder bed 132 and then dumps any residual powder into an overflow container 136. Positioned nearer the top of the process chamber 100 are radiant heater elements 122 that pre-heat the feed powder and a ring or rectangular shaped radiant heater element 120 for heating the surface of powder bed 132 in the target area 110. This heater element 120 has a central opening which allows laser beam 104 to pass through the optical element 116. After a traversal of the counter-rotating roller 130 across the powder bed 132 the laser selectively fuses the layer just dispensed. Then the roller 130 returns from the area of the overflow chute 136, the feed piston 125 pushes up a prescribed amount of powder 129 in powder cartridge feed system 124 and the roller 130 dispenses powder across the powder bed 132 and the target area 110 in the opposite direction to that previously traveled and proceeds to the other overflow chute 138 to drop residual powder. Before the roller 130 begins each traverse of the powder bed 132, center part bed piston 128 drops the portion of the powder bed 132 overlying its supporting part bed 131 into build chamber 106 by the desired layer thickness to make room for additional powder needed for the next layer of the article cross-section to be formed.

The powder cartridge feed systems 124 and 126 include feed pistons 125 and 127, controlled by motors (not shown) to move upwardly and lift (when indexed) a predetermined volume of powder into process chamber 102. Part bed piston 128 is controlled by a motor (not shown) to move part bed 131 downwardly into build chamber 106 below the floor of chamber 102 by a small amount, for example 0.125 mm, to define the thickness of each layer of powder to be processed. Roller 130 is a counter-rotating roller that translates powder from powder cartridge feed systems 124 and 126 via feed pistons 125 and 127 onto target area 110. When traveling in either direction the roller carries any residual powder not deposited on the target area 110 and powder bed 132 into overflow cartridges (136,138) on either end of the process chamber 102. Target area 110, for purposes of the description in this disclosure, refers to the top surface of heat-fusible powder (including portions previously sintered, if present) disposed above part bed 131 of FIG. 1 and includes the fused and unfused powder disposed on part bed 131 which will be referred to herein with respect to FIG. 3 as part powder bed 162. System 100 of FIG. 2 also requires radiant heaters 122 over the feed pistons to pre-heat the powder to minimize any thermal shock as fresh powder is spread over the recently sintered and hot target area 110. This type of dual push up piston feed system with heating elements for both feed and part beds is implemented commercially in the Vanguard selective laser sintering system sold by 3D Systems, Inc. of Valencia, Calif. An alternative powder delivery system (not shown) that uses overhead hoppers can be utilized to feed powder from above and either side of powder bed 132, in front of a delivery apparatus such as a wiper or scraper.

Figure 3:
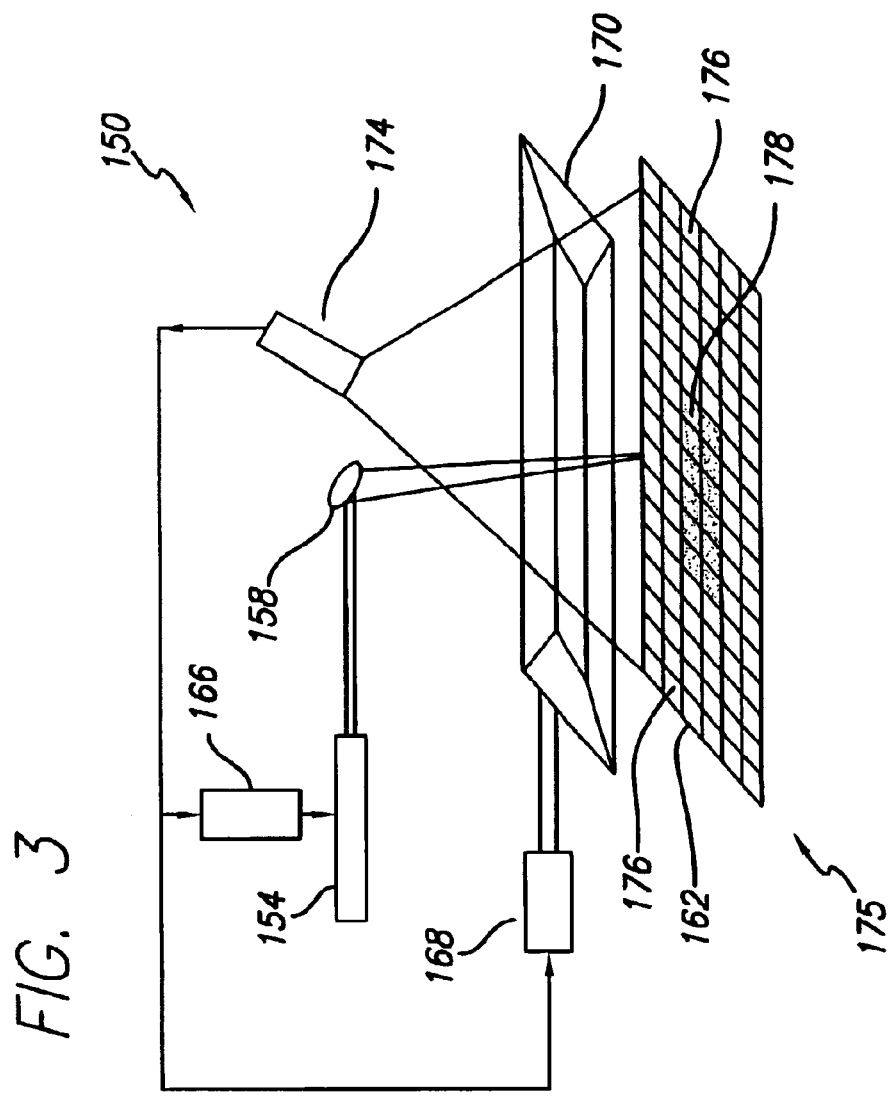
FIG. 3 is a first view of the system of the present invention showing the use of a machine vision system.

An apparatus for carrying out the present invention can be seen diagrammatically in FIG. 3 and is indicated generally as numeral 150. For clarity of illustration the surrounding process chamber and machine is omitted and only the relevant mechanisms are shown. A means for selectively fusing selected portions of a layer of powder is provided by a laser 154 to provide energy to selectively fuse powders having its beam directed by a scanner system 158. A preferred laser is a carbon dioxide gas laser that is typically between 10 and 200 watts in power. Other lasers that provide the required energies at appropriate wavelengths can be used. The scanning system is typically galvonometer based but could use other approaches. A part powder bed 162 is heated by a zoned radiant heater system 170. The zoned radiant heater system 170 can be of any shape but generally has a shape that matches the geometry of the part bed 162 and has a central open region through which the laser beam and any temperature sensors line of sight passes. In the case illustrated in FIG. 3, the rectangular part bed has a rectangular arrangement of the radiant heater. These radiant heaters can be any number of types including, for example, quartz rods or flat panels. The zoned radiant heater system 170 can be configured so that the heat input to different parts of the radiant heater can be varied in either a radial or a circumferential direction. A machine vision system 174 is positioned to image the part powder bed 162. This machine vision system 174 is preferably an infrared camera, such as those available commercially as the IRI 1002 from Irisys of Towcester, UK or the FLIR A20M model from FLIR of North Billerica, Mass. However, other systems such as a standard CCD camera measuring gray scale difference could be used. This camera is imaging the entire part powder bed 162, including the area 178 containing the topmost fused or melted layer of the article(s) be made and provides a digital output of the actual temperatures in the region of the three-dimensional part being built or other desired areas of the part powder bed 162.

Not shown is the means for depositing and leveling a layer of powder in the target area. A number of different approaches are possible here. One potential system is described in U.S. Pat. No. 5,252,264, and is practiced in commercial systems such as the aforementioned Vanguard laser sintering system. This system feeds powder from each side of the target area by means of push up powder feed systems and then levels those powders with a counter-rotating roller system. Another alternative approach is to feed powders from overhead powder bins and level with wiper blades.

In operation the image from device 174 is digitized and the part bed divided up into a part bed matrix indicated generally by the numeral 175 with an average temperature for each cell 176 of the matrix 175. These temperatures are compared to a desired set point temperature and control signals then are sent to controller 168 to adjust the zoned radiant heater to moderate the bed temperatures to minimize deviations from the set point temperatures. Any number of objective functions could be used such as for example a least squares approach—minimizing the sum of the squares of each cell's temperature deviation from set point. At the same time control signals would be sent to controller 166 to adjust the laser power based on temperature deviations from a desired set point temperature for the cells 176 associated with the fused or melted region 178.

This approach can be used to control the overall top layer of powder temperatures before the laser selectively fuses the next layer of powder. An improved level of control can then be implemented during the actual laser operation as follows. A historical logging of build data including parameters such as heater temperature and laser power and scanning speed is collected for the exact or similar three-dimensional parts. From this data a mathematical model is created using a custom or commercial software package for finite element thermal analysis of every cell in the part powder bed. Suitable commercial software packages that can be rewritten for use in real time for machine control include NE Nastran by Noran Engineering, Inc. of Los Alamitos, Calif. and RadTherm from ThermoAnalytics, Inc. of Calumet, Mich. Next an IR camera is employed in the current build to obtain the actual temperature of the top layer of powder to compare with the output of the finite element thermal analysis. Then an iterative bounding process is used to estimate the desired thermal properties of future variations of the build process from the actual temperature recordings of the IR camera compared to the mathematical model until the desired thermal properties and the variations in the build process coincide. Then that data is used to adjust the zoned radiant heater system, the energy beam power and/or the scanning speed of the laser during the laser-directing step to achieve the ideal or desired temperatures in the top layer of powder estimated from the mathematical models. The overall temperature control of this two level control process results in a dramatic improvement over historical control. Temperature control is being implemented in the layer dispensing and leveling step as well as during the laser directing step. In this approach the mathematical model is understood to encompass the process of collecting all of the data and defining the future variations of the build process from the actual temperature recordings of the IR camera.

This design approach improves the overall temperature control in the top layers of the part bed and acts to reduce the temperature differences between the powder just fused and the surrounding non-fused powder, thereby reducing undesirable shrinkages that can lead to curl and distortion of fabricated articles.

Additionally, where the powder bed has multiple three-dimensional objects being fabricated in the same build, and there is non-uniformity in the powder bed temperature, the present system affords the opportunity to adjust the energy power of the laser beam, as well as the laser scanning speed, in different areas of the powder bed to achieve temperature control over the entire powder bed and over the cross-sections of multiple parts being fabricated to obtain successful builds for all parts being fabricated with reduced and undesirable shrinkages and less resultant curl and distortion.

Having illustrated and described the principles of our invention in a preferred embodiment thereof, it should be readily apparent to those skilled in the art that the invention can be modified in arrangement and detail without departing from such principles while employing the invention in a laser sintering system. For example, it is to be understood that the zoned radiant heater system is intended to encompass multiple radiant heaters, multi-zone radiant heaters, and radiant heaters of different geometric shapes and configurations such as annular, rectangular, rod or panel. All patents and patent applications referenced herein are hereby specifically incorporated by reference in pertinent part. All modifications coming within the spirit and scope of the accompanying claims are encompassed.

What is claimed:

1. A method for forming a three dimensional article by laser sintering comprising the steps of:
   (a) dispensing a first top layer of powder on a target area;
   (b) moderating the temperature of said first top layer of powder to a predetermined temperature;
   (c) directing an energy beam over said target area causing said first top layer of powder to fuse powder in select locations to form an integral layer;
   (d) dispensing a second top layer of powder over the fused and unfused powder of said first top layer;
   (e) moderating the temperature of said second top layer of powder to a second predetermined temperature;
   (f) directing said energy beam over said target area causing said second top layer of powder to form a second integral layer bonded to said first integral layer; and
   (g) repeating steps (a) to (f) to form additional layers that are integrally bonded to adjacent layers so as to form a three dimensional article, wherein the temperature moderating steps comprise: using a machine vision system to image multiple temperatures of the current top layer of powder and adjusting those temperatures by adjusting the radiant heat output from a zoned radiant heater located above the target area.

2. The method of claim 1 wherein said machine vision system is an infrared camera.

3. The method of claim 2 wherein said energy beam is a carbon dioxide laser.

4. A method for forming a three dimensional article by laser sintering comprising the steps of:
   (a) dispensing a first top layer of powder on a target area;
   (b) moderating the temperature of said first top layer of powder to a predetermined temperature;
   (c) directing an energy beam over said target area causing said first top layer of powder to fuse powder in select locations to form an integral layer;
   (d) dispensing a second top layer of powder over the fused and unfused powder of said first top layer;
   (e) moderating the temperature of said second top layer of powder to a second predetermined temperature;
   (f) directing said energy beam over said target area causing said second layer of powder to form a second integral layer bonded to said first integral layer; and
   (g) repeating steps (a) to (f) to form additional layers that are integrally bonded to adjacent layers so as to form a three dimensional article, wherein the directing steps include the sub steps of:
      i. estimating, from known mathematical models, the desired temperatures in the region of the part being produced;
      ii. reading, from the digital output of a machine vision system, the actual temperatures in the region of the part being produced; and
      iii. adjusting the energy beam power and scan speed during the directing step based on differences between the desired and actual temperatures to achieve desired temperatures across said target area.

5. The method of claim 4 wherein said machine vision system is an infrared camera.

6. The method of claim 5 wherein said energy beam is a carbon dioxide laser.

7. An apparatus for producing parts from a powder, the apparatus comprising:
   (a) a chamber having a target area at which an additive process is performed;
   (b) means for depositing and leveling a layer of powder on said target area;
   (c) means for fusing selected portions of a layer of the powder at said target area;
   (d) machine vision system for measuring temperatures across the x-y coordinates of said target area; and
   (e) radiant heater for heating said target area to control temperatures of fused and unfused powder at top surface of said target area.

8. The apparatus of claim 7 wherein said machine vision system is an infrared camera.

9. The apparatus of claim 8 wherein said radiant heater is a zoned radiant heater that has different zones to deliver different levels of energy to different parts of said target area.

10. The apparatus of claim 9 wherein the power output of said zoned radiant heater can be varied around the circumference of said zoned radiant heater.

11. The apparatus of claim 10 wherein the power output of said zoned radiant heater can be varied in a radial direction from the center of said target area.

12. An apparatus for producing parts from a powder, the apparatus comprising:
   (a) a chamber having a target area at which an additive process is performed;
   (b) means for depositing and leveling a layer of powder on the target area;
   (c) an energy beam for fusing selected portions of a layer of the powder at the target area;
   (d) machine vision system for measuring temperatures across the x-y coordinates of said target area; and
   (e) control means for adjusting said energy beam scan speed and power in response to said measured temperatures and to desired temperatures estimated from mathematical models.

13. The apparatus of claim 12 wherein said machine vision system is an infrared camera.

* * * * *